Nov. 18, 1952  N. RANSOHOFF  2,618,283
APPARATUS FOR TREATING METAL PARTS WITH LIQUID
Filed July 25, 1945  9 Sheets-Sheet 4

INVENTOR.
Nathan Ransohoff
BY Wood, Arey, Herron & Evans
Attorneys

Nov. 18, 1952 N. RANSOHOFF 2,618,283
APPARATUS FOR TREATING METAL PARTS WITH LIQUID
Filed July 25, 1945 9 Sheets-Sheet 8

INVENTOR.
Nathan Ransohoff
BY Wood, Arey, Herron & Evans
Attorneys.

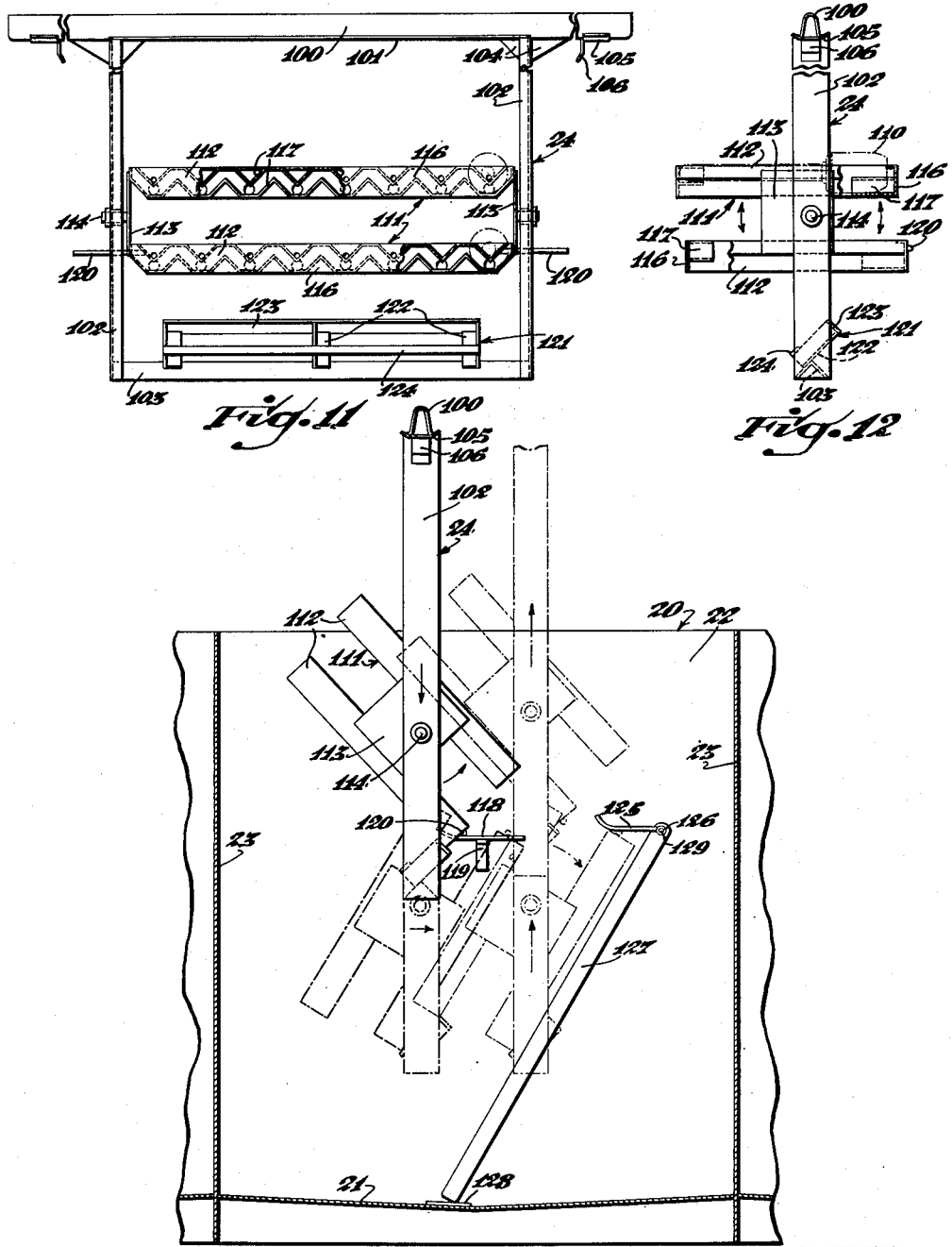

Patented Nov. 18, 1952

2,618,283

UNITED STATES PATENT OFFICE 2,618,283

APPARATUS FOR TREATING METAL PARTS WITH LIQUID

Nathan Ransohoff, Cincinnati, Ohio, assignor to N. Ransohoff, Inc., Elmwood, Ohio, a corporation of Ohio Application July 25, 1945, Serial No. 606,989

1 Claim. (Cl. 134—68)

This invention relates to equipment for treating metal parts and is particularly directed to a machine which will convey the parts through a series of treatment tanks or chambers.

It has been the general objective of this inventor to provide a machine which includes one or more tanks to and through which part supporting racks are fed or conveyed so as to subject the parts to treatment.

Further, it has been the object to provide conveying apparatus which will move the parts in a generally horizontal direction and which will lift the parts over the walls separating adjoining and successive tanks whereby the movement of the parts is continuous and automatic.

Still further, it has been the object to provide means cooperating between the horizontal feed movement and the vertical lifting movements for insuring pick-up of the racks, carrying the parts, and further for spacing the racks as they move through the tanks.

Still further, it has been the object to provide apparatus within the tanks for adjusting the parts on the racks so as to subject all surfaces, particularly interior surfaces, to the treatment. For example, assuming that closed end tubes or buckets are being treated, these pieces are swung so as to permit the treatment solution to enter the interiors thereof and are inverted so as to empty them before they leave the tank.

Still further, it has been the object to provide racks for carrying the parts which are efficiently acted upon by the conveying means and which include supporting trays which are movable in the racks for exposing all surfaces to treatment.

Still further, apparatus has been provided for subjecting the parts to a drying treatment as they leave the machine, this last treatment being a part of the continuous operation.

These objectives have been accomplished in the machine disclosed in the drawings, this machine being exemplary of the broad concepts.

Other objects and certain advantages will be more fully apparent from a description of the drawings in which:

Figure 11 is a side view of one of the racks for the parts to be treated, certain parts being broken away for better illustration.

Figure 12 is an end view of the rack of Figure 11 with parts broken away for showing greater detail.

Figure 13 is a sectional view taken longitudinally of the machine through one of the treatment tanks for illustrating the mechanism which shifts the pivoted carriers on the racks for treating and draining the elements being treated such as shells.

Figure 1:
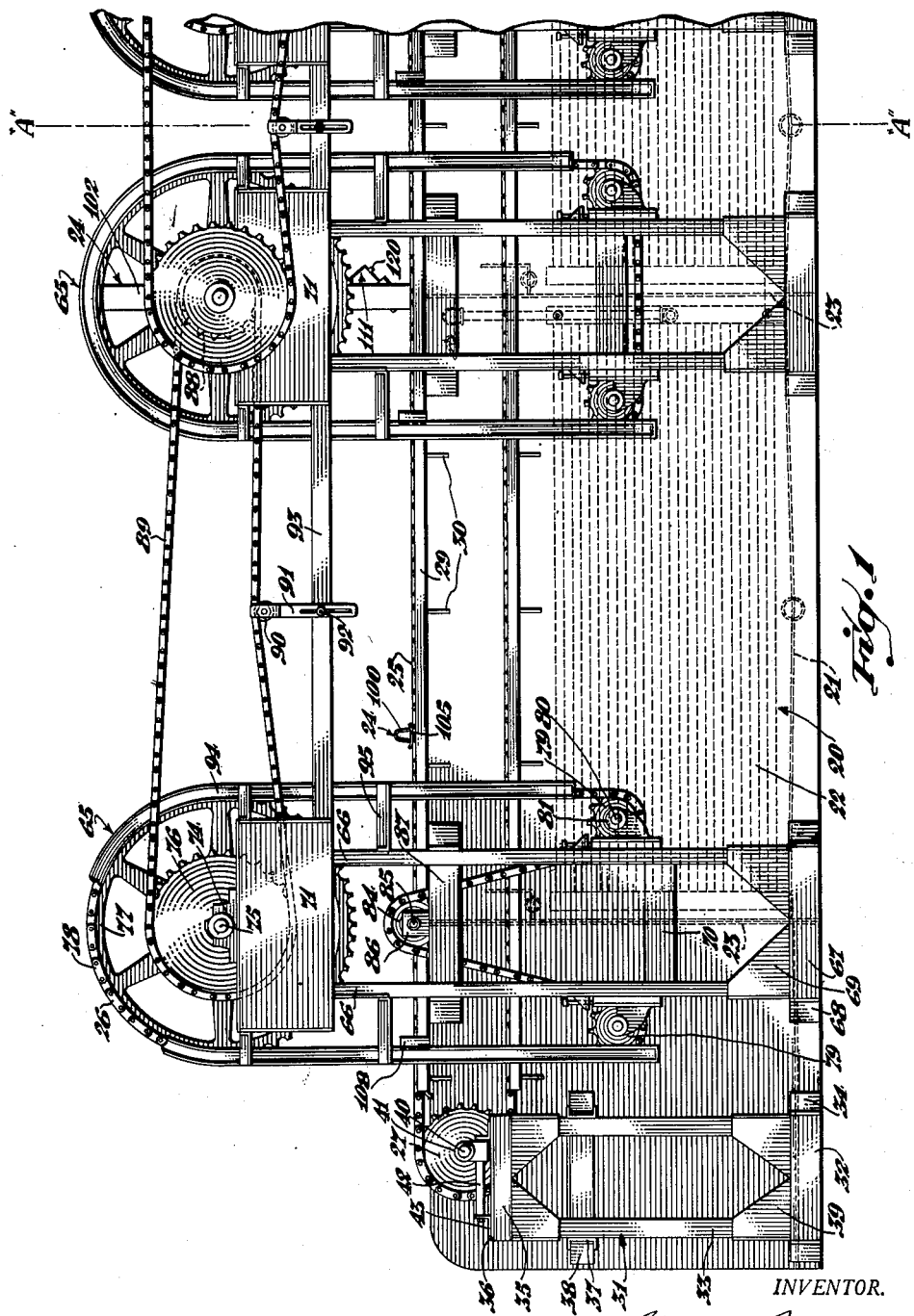
Figure 1 is a general side view of the intake end of the machine.

The embodiment of the invention shown in the drawings consists of a treatment machine adapted to carry the work through a wash tank, a rinse tank. a treatment tank, a rinse tank, a chromic acid tank, and a drying chamber. This, of course, is a specific application of the conveying system, it being obvious that the principles of the system will remain the same regardless of the order, type or number of treatments performed on the work. The mechanism for transferring the racks carrying the work from one tank to the next is the same except for minor variations relating to timing in particular.

Because of the length of the particular machine shown here it has been illustrated on three sheets with the break lines between the portions shown in dot and dash lines indicated at A and B respectively.

A long tank, indicated at 20, is provided. This tank includes a bottom 21 spaced from the floor, sides 22 and a plurality of cross walls 23 making up the various tanks. The racks 24 (Figure 11) are conveyed through these tanks by means of horizontally moving chains 25 and vertically moving chains 26.

The horizontally disposed chains 25, one on each side of the tank structure 20, are extended between idler sprockets 27 at the intake end of the machine and driving sprockets 28 at the discharge end of the machine.

The runs of each chain are supported on channel-shaped guide rails 29 attached along the sides of the tank and braced by means of ribs 30. The sprocket gears 27, 28 are mounted on platforms 31 in each case. These platforms are built of angle iron strips to provide a rigid structure and are attached to the sides of the tanks. In each case base elements 32 connect the bases of legs 33 and are connected to the tank sides by means of brackets 34. Top rails 35 connect the upper ends of the legs and a plate 36 forms the top. Channel iron elements 37 fix the upper end of each platform to the side of the tank by means of brackets 38. Gusset plates 39 stiffen the connections between the posts or legs and the top and bottom rails.

Each idler sprocket 27 is fixed on the inner end of a shaft 40. This shaft is journaled in adjacent and spaced bearings 41. These bearings are adjustably mounted on guides 42 disposed parallel with the runs of the chains. These guides are attached to the plate 36 by means of brackets 43. Thus the bearings 41 may be adjusted to tighten the chain.

The chains 25, 25 are driven by means of the driving sprockets 28, 28 (Figure 8) at the discharge end of the machine. These sprockets are driven from an electric motor 45 mounted on the top of a platform 46. The motor pulley 47 delivers power to the pulley 48 of a variable speed unit 49 through a belt 50. The motor is adjustably mounted on a base 51 and speed control is effected through a hand wheel 52.

The output shaft 53 of the reduction unit carries a small sprocket 54 driving a sprocket gear 55 fixed on a shaft 56 disposed transversely of the machine. A chain 57 connects these gears 54, 55. The shaft 56 is journalled in bearings 58, 58 on each side of the top of the platform 46. A sprocket 59 is fixed on each end of the shaft 56 beyond the respective sides of the drying chamber. Chains 60, 60 connect these sprocket gears 59, 59 to sprocket gears 61, 61. Each gear 61 is fixed to a respective shaft 62 mounted in bearings 63, 63 mounted on the top of a platform 31 like that used for the mounting of the idler sprocket gears 27 at the intake end of the machine. Each shaft 62 carries a driving sprocket gear 28 at its inner end.

Figure 2:
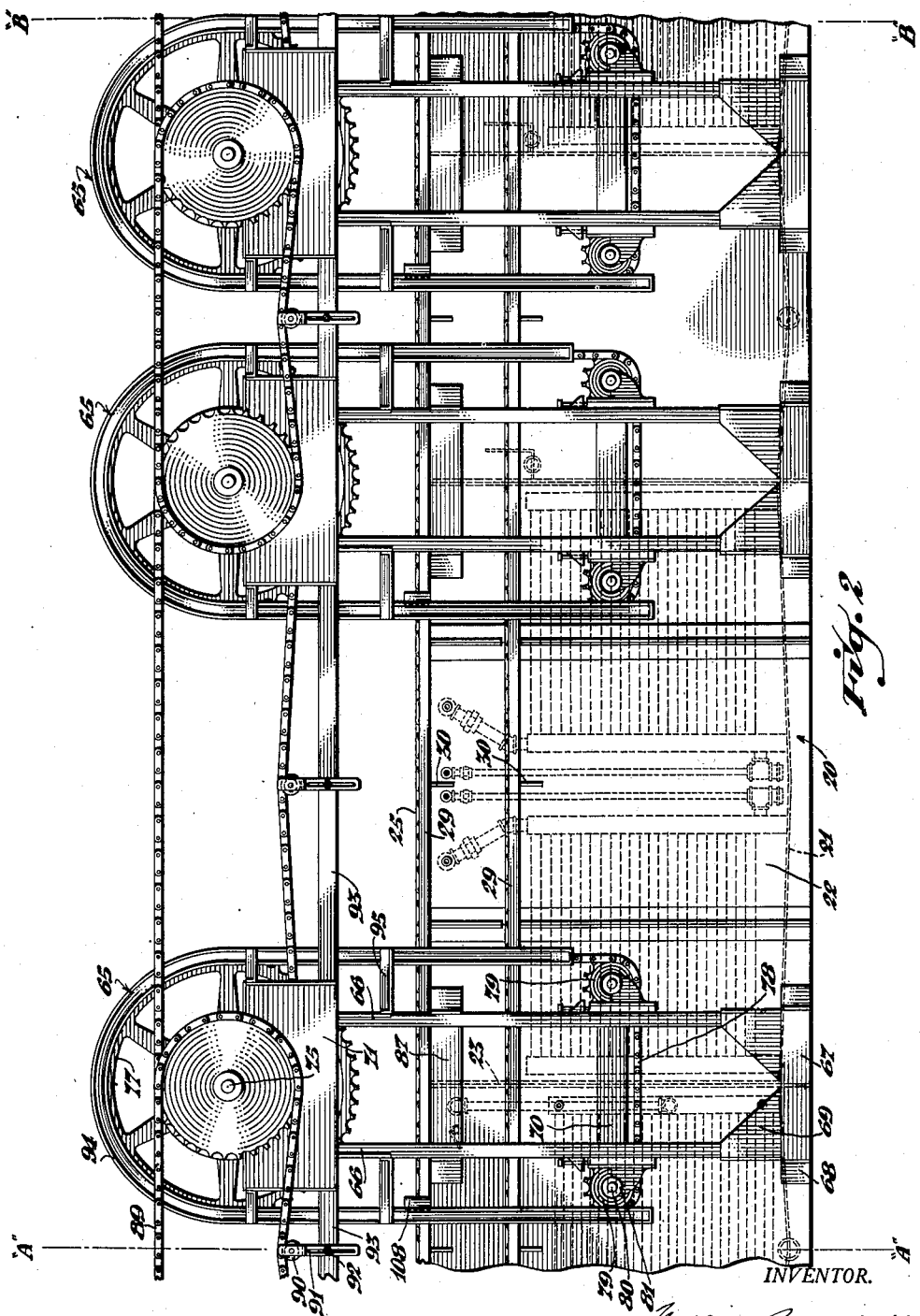
Figure 2 is a general side view of the intermediate portion of the machine.

It will be noted that the runs of the chains 25, 25, particularly the upper runs, have flat upper surfaces (Figures 1, 2 and 3) disposed above the channel grooves of the rails 29. This arrangement is provided so that the runs may directly support and transport the racks 24 in their feed longitudinally of the machine, and in order that the chains may slide under bars at the stops whereby accurate timing apparatus is not required.

In this particular machine illustrating the principles of the invention there are six vertically operating conveyor units generally indicated at 65. One is provided for each partition 23. The differences between these conveyor units are slight so that a description of one will suffice for all with the exception of the minor variations.

The supports for the chains and gears at each side of the machine are in the nature of vertically arranged frameworks providing platforms for the sprocket bearings. Each framework includes two standards or legs 66, 66 rising from horizontal base elements 67 attached to the side of the tank by means of brackets 68. Gusset plates 69 stiffen the connections of the standards and base members; channel iron elements 70 further brace the standards and secure them to the tank walls. Angle iron elements mainly are used in the fabrication of the supports and welding is used as the means for uniting the parts.

A platform 71 is built on the top of the standards made up of angle iron elements and plates. Upon this platform are mounted bearings 74, 74 spaced apart thereon and journaling a shaft 75. A driving sprocket gear 76 is fixed on the shaft between the bearings and the platform is built to provide clearance for this sprocket gear. On the inner end of the shaft 75 a large conveying chain driving gear 77 is fixed. A continuous conveyor chain 78 is engaged on this sprocket gear. Its runs extend downward vertically and engage idler sprockets 79, 79.

Figure 10:
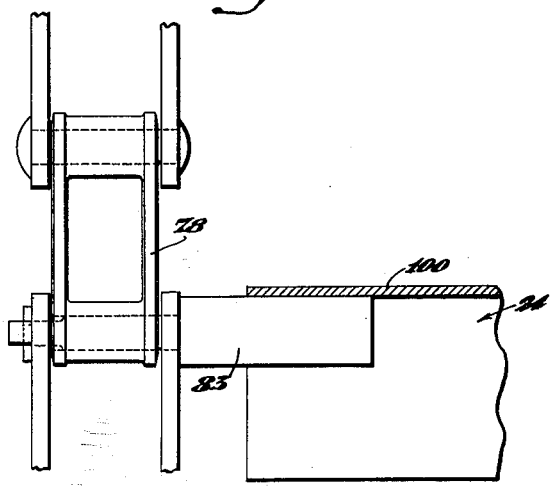
Figure 10 is an enlarged fragmentary view showing a pick-up pin of a vertical rack or carrier lifting chain in engagement with one end of the rack.

The idler sprockets are fixed on shafts 80 journaled in bearings 81 fastened to the standards 66. The sprockets 79, 79 are disposed between the tank wall and the line of the inner sides of the standards. In order to lengthen the time it takes for the pick-up pins 83 (Figure 10) of the respective chains to pass a given point the chain is looped over another idler sprocket 84 located above the sprockets 79, 79. This sprocket 84 is fixed on the end of a shaft 85 journaled in spaced bearings 86, 86 fixed on brace members 87.

The driving sprocket gear 76 is driven from a smaller gear 88 on the next unit 65 and thus the rate of movement of the particular pick-up pin is much less than that of the pins of the other units. A chain 89 connects the sprocket gears 76 and 88. This chain is tightened by means of an adjustable roller 90. This roller engages the lower run of the chain and is carried by an arm 91 having slotted engagement with a fastening screw 92 fixed to a support bar 93 extending between the adjacent platforms 71, 71. A guard rail 94 of inverted U-shape is fixed to each framework by means of brackets 95 and covers the outer side of the conveyor chain.

The racks 24 are illustrated in Figures 11, 12 and the movement of the carriers in the racks in Figure 13. An inverted channel element forms the supporting top rail 100 of the rack. This rail has horizontal stiffening flanges 101 along its intermediate portion. Channel elements form the vertical side members 102 of the racks. These elements are welded to the top rail 100 at the respective ends of the flanges 101. A lower rail 103 connects the lower ends of the side members 102. This lower member is an inverted angle iron strip. Gusset plates 104 brace the connections of the side members to the top rail.

Figure 4:
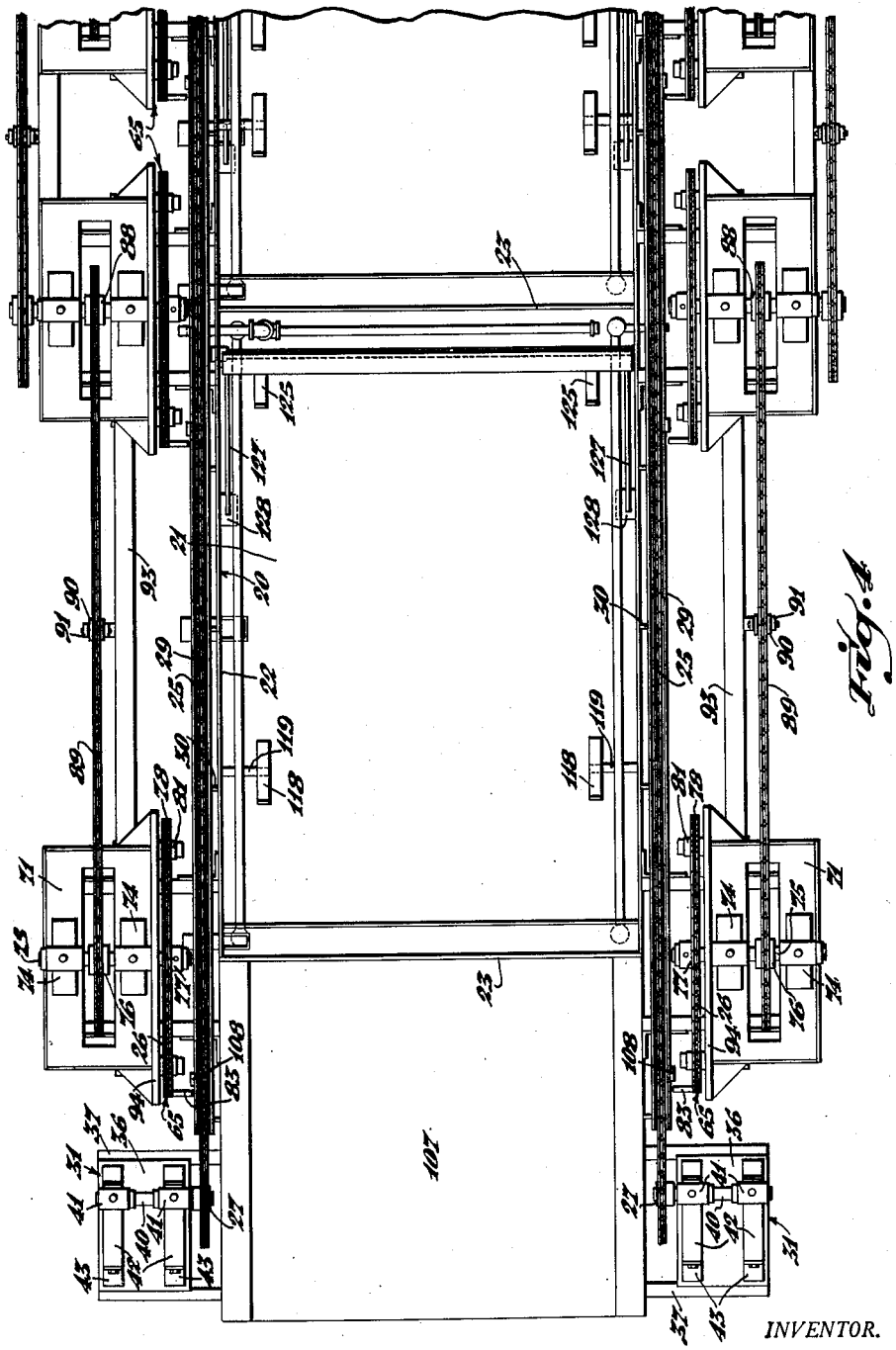
Figure 4 is a general top plan view of the intake end of the machine.
Figure 5:
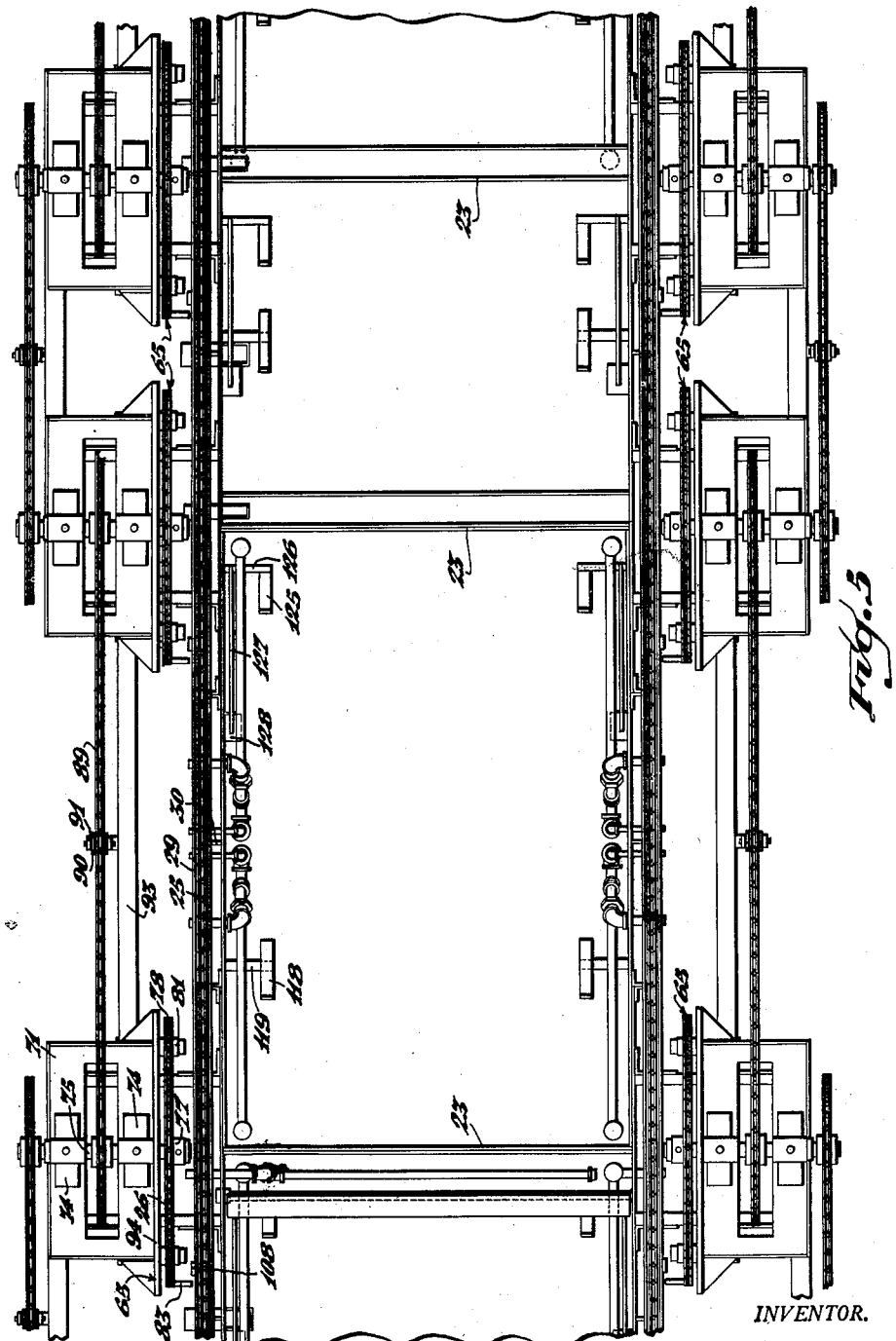
Figure 5 is a general top plan view of the intermediate portion of the machine.
Figure 7:
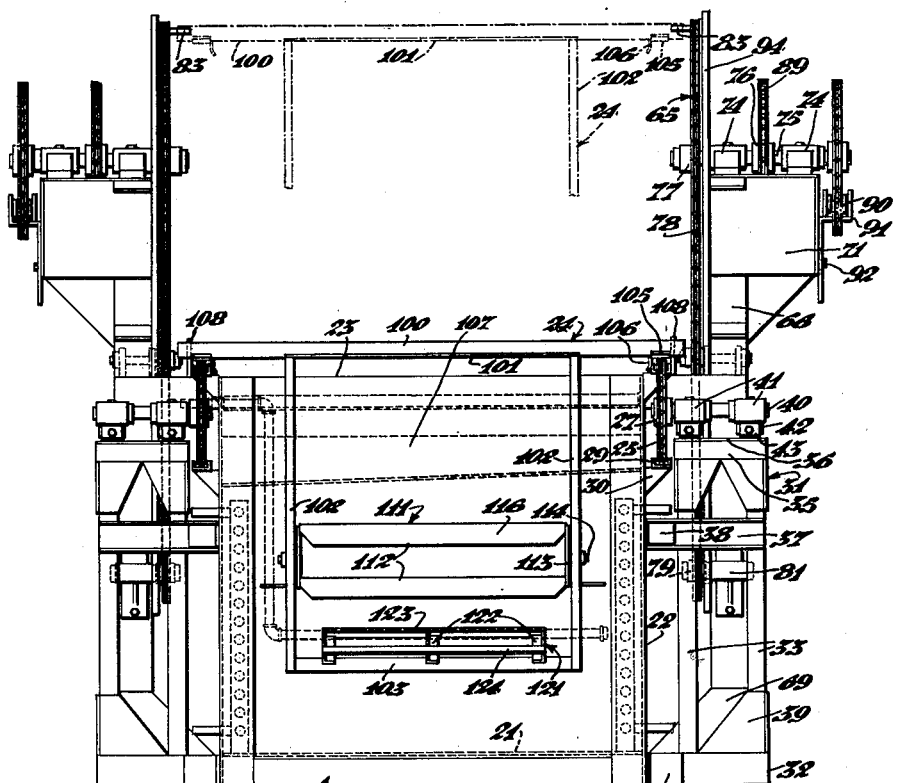
Figure 7 is a general view of the machine looking into the intake end thereof.

Pads 105 are welded to the underside of the top rail being spaced in from the ends of the top rail (Figure 11)). These pads include spacing flanges 106 extending downward and being flared inwardly at their lower ends. When the carrier is inserted in the space 107 (Figures 4 and 7) at the intake end of the machine these pads will lie upon the chain runs 25 and the extensions or flanges 106 lie inside of the chain runs adjacent thereto.

The ends of the top rail 100 overhang the chain runs and are engaged by the pick-up pins 83 on the vertical conveyor chains 78. These pins engage in the curved top of the rail and the rack is pivotally suspended and will hang in a vertical position under the weight of the work elements in the rack. The fixed stops 108 (Figures 1 and 7) attached to the outside of each of the upper chain guides 29 are engaged by the rack when it is transported by the horizontal chains to the correctly aligned position relative to the pick-up pins. Thus, when the pick-up pins come up under the ends of the top rail of the rack positive engagement is insured. The rack will then be elevated in a direct vertical path until the lower end of the rack is above the upper edge of the tank wall 23. Thereupon, the pick-up pins will travel in a curved path carrying the rack generally horizontally until it is beyond the wall. The pick-up pins then move downwardly vertically until the rack again rests on the horizontal chains 25 for horizontal movement through the tank.

The work pieces (rocket shells 110 in this case) are supported in a carrier device 111. Each carrier includes two tray 112. Pivot plates 113 connect the ends of the trays so that the trays are disposed in spaced arrangement one above the other. The plates include pivot pins 114 journaled in the side members 102. Thus, the carriers are free to swing in the frame of the rack.

Each tray includes side walls 116. Corrugated strips 117 are disposed along the front and rear edges of the trays within the tray. The rear strip is disposed higher in the tray so as to support the smaller ends of the work pieces 110. The carriers are balanced on the rack so that they will stay in slanting inverted and upright positions as hereinafter described. When the rack is lowered into the tank the carrier device 111 is disposed in position with the front end down (Figure 13) and the tubes 110 inverted so as to hang freely.

A cam plate 118 is attached to each side of the tank by means of a bracket element 119. Pins 120 project laterally from each side of the carrier device and are disposed so as to engage the cam plates 118 as the rack is lowered. Continued lowering movement of the rack will swing the carrier device to the position shown (Figure 13) in dot and dash lines at the lower left-hand side of the view with the rear end of the lower tray in contact with the stop 124.

A stop means 121 is disposed across the lower end of the rack on the lower rail 103. This means consists of angle iron pieces 122 welded to the angular upper side of the rail and thus extending upwardly. Along the tops of these pieces a stop element 123 is fixed. Another stop element 124 is fixed across the lower ends of the pieces 122. The rear lower edge of the lower tray engages the stop 124 when the tubes are in the angular upright position they assume when the rack has been fully lowered into the tank. Thus, the liquid used in the particular tank can enter the tubes for cleansing or treating the interiors of the shells.

As the rack is moved horizontally along the machine and within the tank the pins 120 leave contact with the cam plates 118 and move under and in contact with weighted cam plates 125 as shown in dot and dash lines in Figure 13 at the lower right-hand portion of the view. The outer end of each cam plate 125 is flared upwardly so as to direct the pin 120 under the plate. Plates 118 and 125 are in alignment along the inner wall of the tank.

The cam plate 125 is fixed to a sleeve 126 which carries the weight bar 127 lying at an angle in the tank, with its lower end normally engaging a contact pad 128 on the bottom of the tank. The sleeve 126 is journaled on a pivot pin 129 fixed in the tank wall and projecting inwardly toward the rack.

Thus, when the next vertical conveyor chain picks up the rack from the runs of the horizontal chains the pins 120 will prevent immediate upward movement of the forward ends of the trays of the rack. The carrier unit will then swing on its pivots and the work piece will be inverted so as to drain the water or solution from them preparatory to entrance into the next tank. When the forward end of the lower tray engages the stop 123 of the rack frame, further swinging movement of the carrier trays will be blocked. When this occurs the pins 120 will lift the weighted cam plates 125 and will slide past them, the weights then returning the cam plates to normal position for receiving the next carrier unit.

As stated, the first tank is a wash tank, appropriate piping and spray means being provided for this purpose as well as water level maintaining means. Each tank performs a different purpose in the treatment of the parts and contains appropriate piping from the wash tank on through to the drying chamber at the discharge end of the machine. Any arrangement of tanks may be used, depending on the treatment prescribed.

Figure 3:
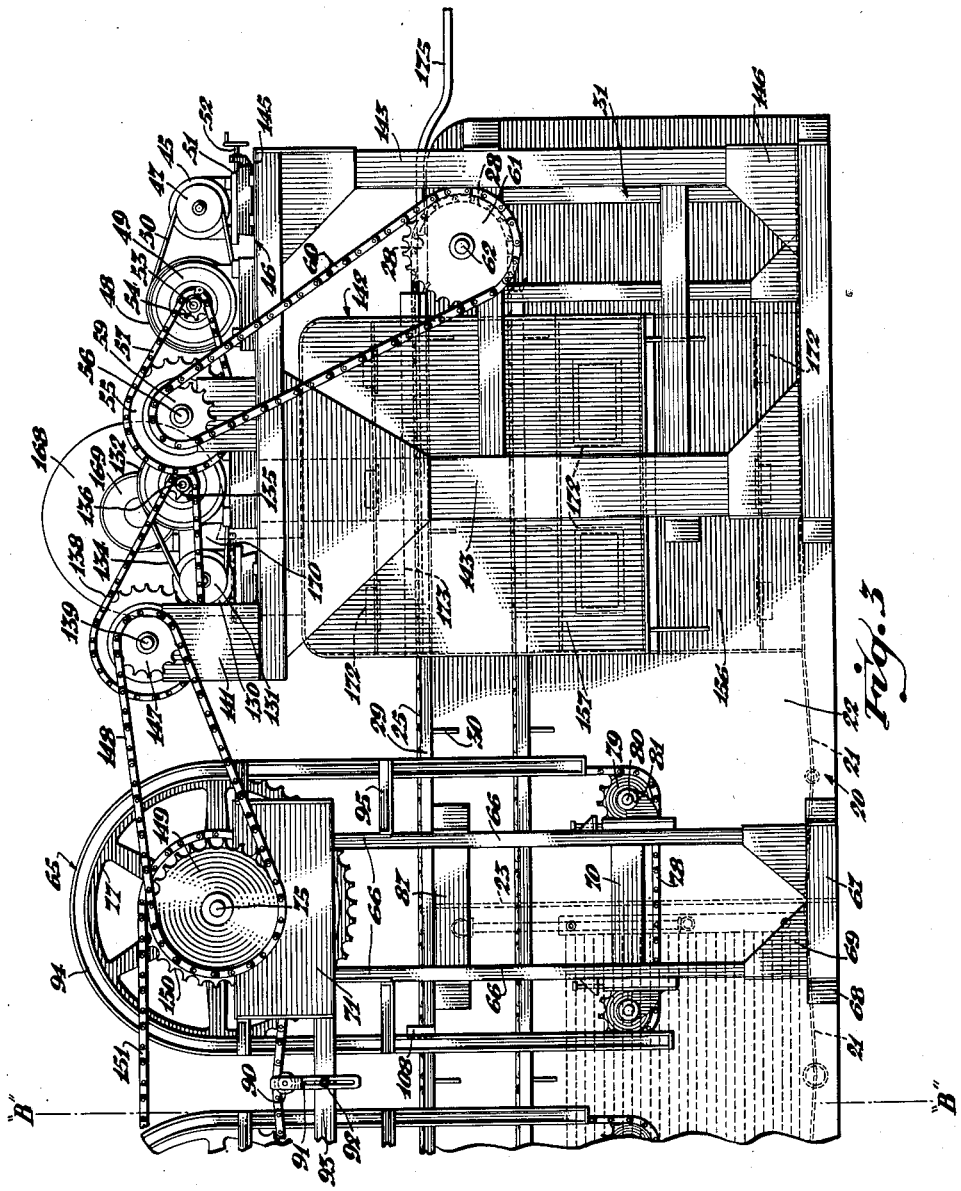
Figure 3 is a general side view of the discharge end of the machine.
Figure 6:
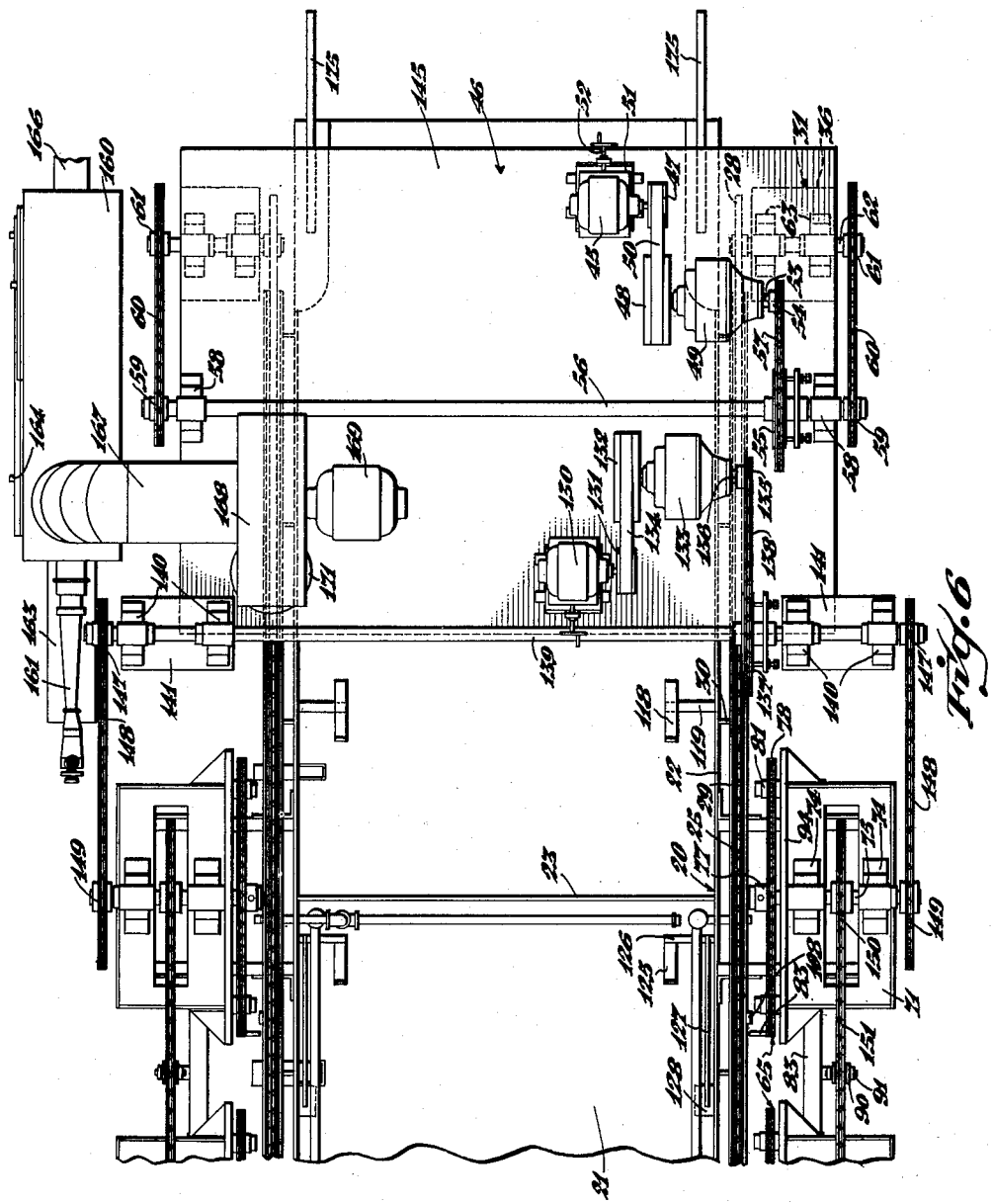
Figure 6 is a general top plan view of the discharge end of the machine.
Figure 8:
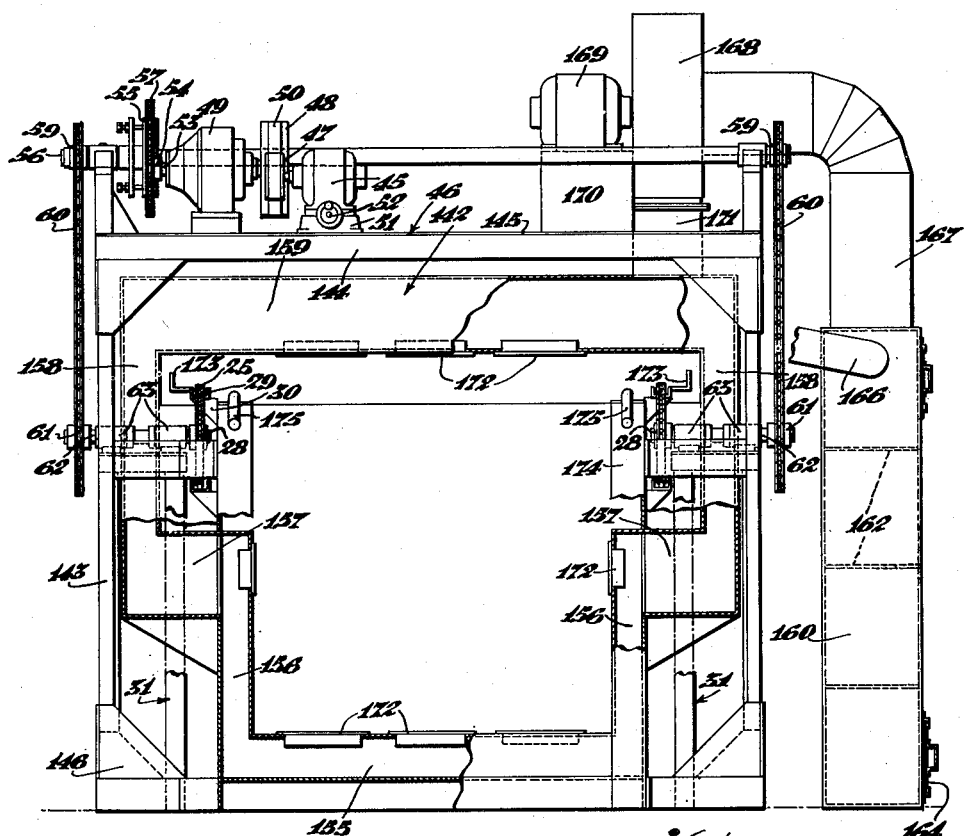
Figure 8 is a general view of the machine looking into the discharge end thereof.

All of the vertical conveyor chains are driven from an electric motor 130 fixed on top of the platform 46 (Figures 3 and 6). The pulley 131 of this motor drives the pulley 132 of a speed reduction unit 133 through a belt 134. This motor is adjustable in the same manner as the motor 45 for tightening its belt. The sprocket gear 135 on the drive shaft 136 of the reduction unit 133 drives a sprocket gear 137 through a chain 138. This gear 137 is fixed on a transversely disposed shaft 139 journaled in sets of bearings 140, 140. These bearings, two in spaced relationship at each side of the machine, are mounted on raised portions 141 of the platform 46. The platform, best illustrated in Figure 8, is built over the drying chamber 142 of the machine. It comprises four posts or legs 143 and a top structure 144 having a plate 145 thereon. The entire structure is built up of channel and angle iron strips welded together. The legs are secured to the tank structure and gusset plates 146 provide stability.

Each end of the shaft 139 carries a sprocket gear 147 which is connected by a sprocket chain 148 to a gear 149 for the vertical conveyor chain next to the drying chamber. These last chains lift the racks over the last tank wall into the drying chamber which will be explained subsequently.

As explained, these rack-lifting chain units are the same throughout with but this exception. The first one described heretofore is the only one including the gear 84 upon which the extra length of the first chain is mounted. The shaft 75 of the last unit also carries a gear 150 in addition to the gear 149. This gear drives the gear 149 of the next unit through chain 151. Thus, the drive is transmitted on through each unit to the first one at the intake end of the machine. The gear 88, however, which drives the gear 76 is a smaller gear so as to slow down the movement of the first conveyor unit. The longer chains of this first unit further slow down the rate at which the racks enter the first tank. This is done so as to give the racks adequate time to move through the first tank before successive racks enter it.

The drying chamber 142 is best illustrated in Figures 3, 6 and 8. This chamber is built around the area through which the racks pass as they leave the machine. The chamber is formed within an air delivery conduit arrangement. This conduit includes a horizontal section 155 which forms the bottom of the drying chamber. Vertical sections 156 extend up from each end of the bottom section. From these sections the conduit extends horizontally outward as at 157 under the horizontal chain and guides and thence upwardly again as at 158 at the outside of the chains and guides. The upper cross section 159 connects these side sections, this cross section being spaced above the upper chain runs so as to clear the racks as they come through (Figure 8). These conduit sections as viewed in side view of the machine are relatively wide so as to provide a drying chamber of sufficient length for adequate drying of the work.

Figure 9:
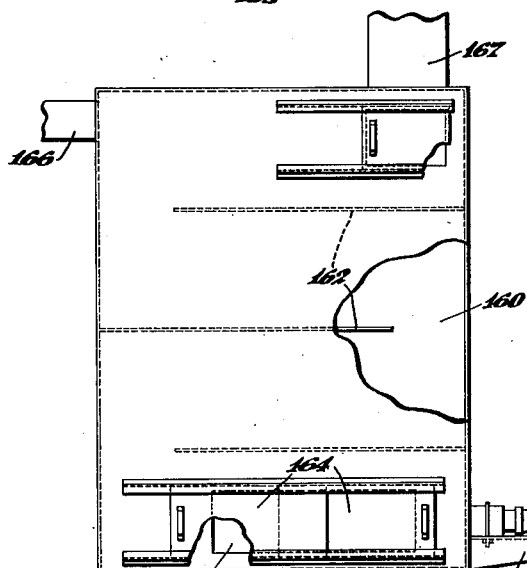
Figure 9 is a side view of the heating unit for heating the air delivered to the drying chamber of the machine.

Hot air is supplied to this conduit from a heating chamber 160 disposed alongside of the machine. This chamber 160 has a burner unit 161 mounted in its base portion and includes baffles 162 (Figure 9) for appropriately heating the air within the chamber. The heating unit is supported on a bracket 163 and a pair of sliding doors 164 provide for adjustment of and access to the air opening 165 in the base of the heating chamber. An exhaust flue pipe 166 is included for the burned gases.

A pipe 167 connects the top of the chamber to the intake side of a centrifugal blower unit 168. This blower is driven by an electric motor 169, the motor being mounted on the top of the platform 46 on a raised portion 170. The blower is mounted on a conduit 171 connecting its outlet to the top of the horizontal top section 159 of the hot air delivery conduit. Numerous outlets 172 are provided in the inner walls of the conduit sections so as to direct the flow of air to the parts supported in the racks.

Guides 173 are provided along the top chain guides or rails 29 for centering the racks in the drying chamber as they pass through. Double tank walls 174 are provided at the end of the machine beyond the hot air conduit, the inner walls being flush with the inner walls of the hot air conduits. Discharge rails 175 formed of rod material extend from the top of these double tank wall portions beyond the discharge end of the machine. The tops of these rails 175 lie below the plane of the tops of the upper runs of the chains so as to receive the racks as they leave the chains. The discharge rails slope downwardly so as to assist in the discharge and removal of the racks.

Having described my invention, I claim:

A machine for treating metal parts, comprising a plurality of treatment solution tanks arranged in end to end relationship, conveyor chains respectively movable horizontally along the series of treatment tanks at opposite sides thereof, stationary support rails slidably engaged by said chains for slidably supporting said chains against deflection under weight loads, means for continuously moving said chains in unison along the series of tanks, racks adapted to support metal parts for immersion thereof in solutions in said tanks, said racks having lateral extensions adapted to rest directly upon said chains and be advanced thereby through frictional engagement therewith, the said chains having flat upper and lower slide surfaces, the lower slide surface being engaged upon the support rails and the upper surface being slidably engageable by the said lateral extensions, positive abutment stops arranged transversely in alignment in respect to said tanks adjacent said chains in the paths of movement of the lateral extensions of said racks, whereby said lateral extensions of said racks come into engagement with said positive stops and are restrained against further movement while the chains are free to move slidably beneath the said lateral extensions, and vertical lift assemblies comprising endless chains having vertically ascending and descending runs extending above and below the horizontal chains and respectively straddling adjacent tanks, the said endless chains of the lift assemblies having lift members engageable with lateral extensions of those racks which are restrained by said positive stops for serially lifting the racks from one tank and lowering them into the next tank until the lateral extensions thereof are re-engaged frictionally upon the horizontal conveyor runs.

NATHAN RANSOHOFF.

REFERENCES CITED

The following references are of record in the file of this patent:

UNITED STATES PATENTS

| Number | Name | Date |
|---|---|---|
| 861,307 | McKinney | July 30, 1907 |
| 1,061,667 | Gerhard | May 13, 1913 |
| 1,222,560 | Olson | Apr. 10, 1917 |
| 1,381,347 | Schaller | June 14, 1921 |
| 1,846,053 | Hannon | Feb. 23, 1932 |
| 1,961,856 | Hall | June 5, 1934 |
| 2,024,373 | Ladewig | Dec. 17, 1935 |
| 2,144,068 | Kronsbein | Jan. 17, 1939 |
| 2,177,982 | Hannon | Oct. 31, 1939 |
| 2,299,618 | Finston | Oct. 20, 1942 |